June 6, 1967  P. H. LEGARRA  3,323,805
ALL METAL DYNAMIC AND STATIC SEAL
Filed July 30, 1964

INVENTOR.
PHILIP H. LEGARRA
BY Fulwider, Patton, Rieber, Lee, and Utecht
ATTORNEYS

United States Patent Office 3,323,805
Patented June 6, 1967

3,323,805
ALL METAL DYNAMIC AND STATIC SEAL
Philip H. Legarra, Gardena, Calif., assignor, by direct and mesne assignments, of one-half to Aircraft Hydroforming, Inc., Gardena, Calif., a corporation of California, one-fourth to Ralph P. Williams, and one-fourth to Ernest J. Zack
Filed July 30, 1964, Ser. No. 386,291
5 Claims. (Cl. 277—112)

This invention relates generally to a dynamic and static sealing device which will withstand extreme temperatures and very high pressures, and more particularly to an all metal, bellows-type sealing device which will operate and give good service under such extreme conditions and with very little or no leakage.

The advent of extreme operating temperatures for hydraulic and pneumatic systems, such as −65° F. to 700° F., or even higher, has made ordinary seal packing, as for example, elastomeric rings or gaskets, useless. Likewise, high pressures on the order of 10,000 p.s.i. cause ordinary seals to have a very high leakage rate, and an extremely short service life. Consequently, there has been much work in the field of all-metal sealing devices for both static and dynamic installations. Most of the joints which have been devised are very expensive and have hand fitted and very close tolerance parts which cannot be replaced or repaired, and which even at best do not provide for a low friction, low leakage, rotatable connection.

In a dynamic seal such as a rotatable joint seal, it is desirable that the joint have low friction, even under high pressures, and at the same time have little or no leakage. By using a properly configurated metal, bellows-type sealing element wherein the ends of the element are in sealing engagement with faces formed in the joint members, it is possible to allow for the rotation by sliding motion between one end of the sealing element and the adjacent sealing face. Both ends of the sealing element may be designed for such sliding engagement and it has been thought desirable from a friction standpoint to allow the sliding motion to occur at either or both ends of the sealing element. Sometimes, under conditions such as pulsating pressures, the motion might vary from one end to the other as the pressure changed. However, as a practical matter under most conditions, once installed, the dynamic sliding movement will occur at only one end of the sealing element and the other end will merely remain static.

While the seal just described is capable of sealing at even very high pressures, I have found that under extreme pressure conditions some slight operating leakage will develop in the seal. In investigating this condition, I found that all of the leakage occurred at the end of the seal where no relative motion was taking place. This may be explained because of the fact that the engaging surface of the sealing element is formed with a soft coating or plating which allows it to conform to the opposed face of the joint member and to smooth out any surface irregularities between the two as the relative movement occurs. This self-smoothing or curing action tends to completely close off any leakage paths that develop. However, at the other end of the seal, where there was no working action, any leakage paths across the interface between the sealing element and the joint member are not smoothed or cured, and as a matter of fact, tend to magnify under the fluid flow thereacross. This causes the seal to have some leakage which under any operating conditions is highly undesirable, even though it is at a very low leakage rate.

An overall object of the invention is thus to provide a sealing device which will seal against relatively rough parts having a somewhat irregular surface finish without leakage under very high pressures.

One important object of the present invention is therefore the provision of a high pressure, all-metal sealing device in which the sealing element interposed between relatively rotatable members is preloaded into fixed engagement with one member at one end of the element, while the other end is free for dynamic sliding motion against the adjacent face of the other joint member.

An equally important object of the invention is the provision of a sealing device in which the metal sealing element is configurated to provide a low friction, smooth sealing surface at one end and a deformable sealing rib adapted to make positive static interlocking engagement at the other end.

Another object of the invention is to provide an all-metal sealing device which will seal positively under both static and dynamic conditions of fluctuating high and low pressures and will accommodate sliding, rotatable or other planar relative motion.

A further object of the invention is to provide an all-metal sealing device having a bellows-type sealing element which may be configurated for axial spring take-up and for fluid pressure loading to any desired degree so as to achieve an extremely low leakage rate under many different conditions of pulsating pressure.

Still another object of the invention is to provide an all-metal sealing device having retaining means to force one end of the sealing element into fixed non-rotatable engagement with the face of the adjacent joint member while allowing the other end of the sealing element to be free for spring action against its adjacent joint member.

Still another object of the invention is to provide a sealing device having a bellows-type sealing element making positive static sealing engagement adjacent to one sealing face and positive dynamic sealing engagement with an opposed sealing face to provide for both static and dynamic sealing while remaining in substantial pressure balance under fluctuating pressures.

A still further object of the invention is to provide a bellows-type sealing element having one or more engaging surfaces formed with a soft self-smoothing layer adapted upon relative motion against an opposed surface to smooth over any leakage paths or surface inequalities for positive sealing engagement.

These and other objects and advantages of the invention will become apparent from the following detailed description of a preferred embodiment thereof in which the invention is in a form adapted for installation in an extreme temperature, extreme pressure tolerance needle valve. It will be understood, however, that its use is not limited to such sealing installation and it may be adapted for use in swivel connections, static or dynamic face seals, and valves of various kinds. By changing the convolution and relative proportions of the sealing element and its opposed confronting joint members, the seal can easily be modified to change the preloading, to adapt to both internal and external pressure differentials, and to adjust for varying amounts of misalignment and irregularities in the moving parts. Likewise, the pressure and temperature ranges can be adjusted without departing from the basic configuration and arrangement of the parts.

Referring now to the drawings.

Figure 1:
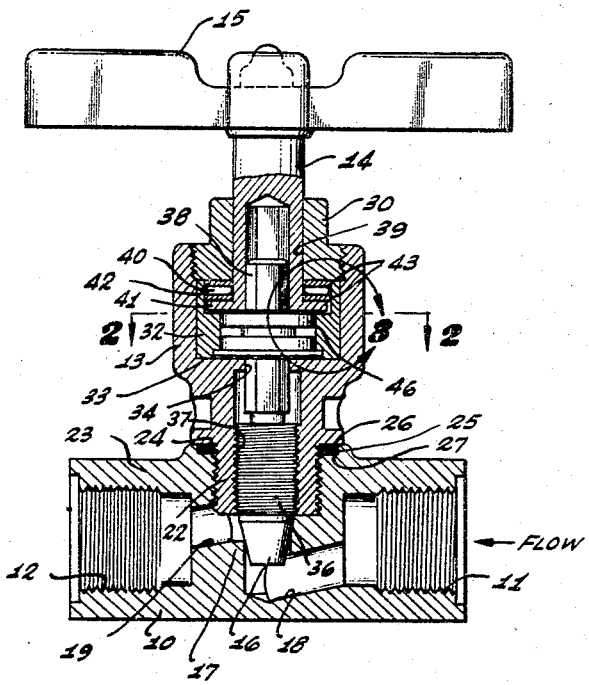
FIGURE 1 is a vertical medial section of a high pressure needle valve embodying the invention.
Figure 2:
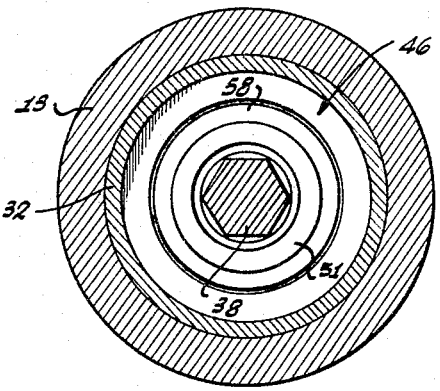
FIGURE 2 is a cross section taken along the line 2—2 of FIGURE 1.

Referring now to FIGURE 1, the valve illustrated is an all-metal needle or control valve which is particularly adapted to extreme pressure tolerances and high temperatures. In such valves, ordinary elastomeric and packing type seals are inadequate, both to withstand the pressures and the temperatures encountered. In the valve an embodiment of my invention is utilized to provide a dynamic seal for sealing around the rotatable control stem. The valve, as shown, has a main lower body member 10 which is formed with an inlet port 11 and outlet port 12. Extending upwardly from body 10 is a head member 13 which supports a rotatable stem 14 having a manual control handle 15 for positioning a lower valve needle 16. Valve needle 16 cooperates with a centrally formed valve seat 17 for both flow control and shut-off. Seat 17 communicates with inlet port 11 through an inlet throttling passageway 18. The valve body 10 and head 13 are desirably formed of high strength, stainless steel for resisting pressure, and the valve needle 16 and stem 14 may be formed of heat treated, corrosion resistant steel to provide good wearing qualities.

The head member 13 is of cylindrical form and is provided on its lower end with a threaded boss 22 which is adapted to engage an internally threaded socket 23 formed in body 10 above seat 17. An external shoulder 24 is formed to seat against the top of body 10 and limit downward movement of the head, and opposite the shoulder 24 a short annular chamber 25 is formed in the body to take a metallic bellows-type static sealing element 26 which may, but probably would not utilize all of the features of my present invention. The sealing element 26 is tightly confined between shoulder 24 and the bottom wall 27 of chamber 25 and serves to prevent any external fluid leakage at the joint between the body and the head.

As shown, the element 26 is of annular and of U cross-sectional shape having upper and lower walls joined together by an annular outer wall. The inside of element 26 is open to the high pressure fluid and this pressure loads the top and bottom walls against the shoulder 24 and the bottom of chamber 25. Such a seal provides good static sealing but has high frictional contact with the facing sealing surfaces and would not be satisfactory for a dynamic seal.

The valve stem 14 is of the non-rising type and is rotatably journalled in head 13 by an upper threaded plug 30 which fits into the upper end of the head, seating downwardly on an annular retaining member 32, that in turn bottoms downwardly against an annular shoulder 33 which faces upwardly in head 13 surrounding a central reduced bore 34.

The valve needle 16 is actually formed on the lower end of an externally threaded valve spindle 36 which is rotatably and threadedly engaged in an elongated internal operating thread 37 formed in the center of head boss 22. Rotation of spindle 36, of course, advances or retracts needle 16 to open or close relative to valve seat 17. In order that the valve stem 14 may be of the non-rising type as is particularly adaptable for remote control operation often desired for high temperature, high pressure systems, the upper end of valve spindle 36 is formed with an elongated polygonal key or wrenching surface 38 which is adapted for sliding interlocking motion in a complemental polygonal keyway or socket 39 formed in the bottom end of stem 14. The length of socket 39 is such that member 38 may be moved upwardly to fully open valve needle 16 without lifting stem 14.

Since the illustrated valve is designed for extremely high pressure use, and in order that the valve may be closed under such pressure conditions, the valve stem 14 is fitted with a needle bearing 40 that is mounted between a lower enlarged stem flange 41 and the bottom of plug 30. Needle bearing 40 is of the type adapted to take severe thrust loading and has a plurality of roller elements 42 mounted between a pair of races 43. With this arrangement, the operating handle 15 may be easily rotated to open and close the valve notwithstanding severe pressure loading that may be directed upwardly in the valve.

Figure 3:
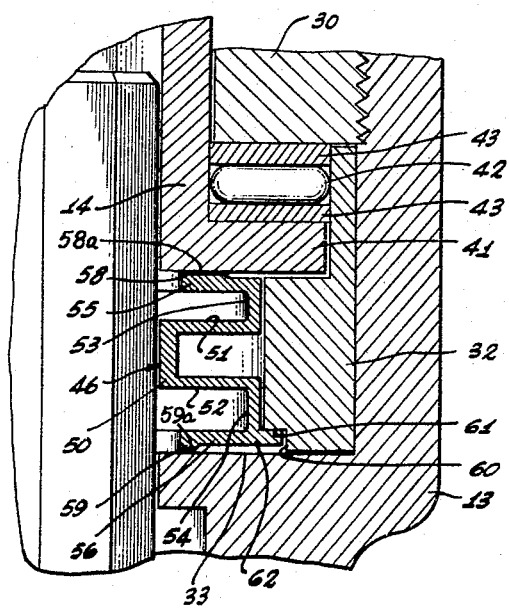
FIGURE 3 is an enlarged fragmentary sectional view of the dynamic sealing element and the adjacent head stem and retainer members taken in the area 3 of FIGURE 1.

It will be understood that it is necessary to effect a positive fluid seal around the valve stem 14 and that this dynamic type seal must be such as not to interfere with the free rotation of the valve stem. Also, because of the high pressure and high temperature characteristics of the valve, it is necessary that the sealing means employed be of all-metal construction. Basically, this is accomplished by means of a bellows-type sealing element 46 which is interfitted between the valve stem 14, the head 13, and the previously mentioned retainer member 32 in such a manner as to seal upwardly against the face of the flange 41 on valve stem 14 and downwardly against the annular shoulder 33 of the head to establish lines of sealing contact which prevent any fluid passage outwardly or upwardly around the stem. The detailed nature of the bellows-type sealing element 46 and its interrelationship with the adjacent sealing surfaces is best seen in the enlarged view of FIGURE 3.

The element 46 may be considered as a spring-like bellows, and in the form shown, has three convolutions or U-shaped annular rings which are integrally connected. The central convolution has an inner, central cylindrical wall section 50 joined to upper and lower radial wall sections 51 and 52, respectively, in a U-shape open outwardly. Upper and lower cylindrical wall sections 53 and 54, respectively, join the central radial walls 51 and 52 at their outer ends and in turn join upper and lower end walls 55 and 56. These upper and lower convolutions form U-shaped sections open inwardly to the high pressure fluid within head 13. The upper end wall 55 faces the bottom of stem flange 41, and the lower end wall 56 faces the bottom wall 33 of the chamber formed in head 13. The outer cylindrical wall sections 53 and 54 are a tight fit within the retainer ring 32 which supports them against the internal pressure.

Considered in section, the radial walls 51 and 52, as well as the end walls 55 and 56, act as cantilevered lever arms and they are all acted upon by the internal pressure acting normal to their surfaces. This would cause the end walls 55 and 56 to be pressure loaded tightly against the opposed faces of the stem and head so as to hinder, if not prevent, relative rotation. To overcome this, the lever arm lengths of the walls 55 and 56 are made shorter than those of walls 51 and 52 by enough to balance the effect of the internal pressure. Of course, since the walls are of annular shape, this is done by controlling the diameters, and it will be seen that the internal diameter of the walls 51 and 52 is smaller than the internal diameter of the free edge of walls 55 and 56.

By varying these diameters, the effective surface areas can be changed so that the seal can be made to pressure load a controlled amount, if it is desired to do so, in order to restrain very high pressures. It can also be understood that the number of convolutions in the element may be changed to give different spring loading and pressure loading effects.

One of the important features of the invention is to be able to avoid leakage while permitting relatively great manufacturing tolerances in the parts. Ground and lapped surfaces are very expensive, and it is also necessary to machine all the parts very precisely if the seal is dependent upon a close fit of the parts. Because of the spring-like nature of element 46, it is possible to compress the end walls 55 and 56 together upon installation, and this will tend to overcome manufacturing tolerances in the flatness, parallelism and concentricity of all the parts, as well as to a certain extent surface roughness. The amount of spring loading which can be used is limited, however, by the friction which it causes. If high friction is to be avoided, full compensation for surface irregularities cannot be achieved. I have found that leakage due to surface roughness in the finish of the parts may be overcome by allowing the parts to work together in a self-lapping or smoothing action. Preferably, the contacting surfaces of the element 46 are plated or otherwise provided with a relatively soft layer which can smooth over surface roughness of the element end walls and the adjacent opposed faces of the joint members. In order that there will be smooth sliding contact with a minimum of friction and yet good sealing contact, I have provided the upper end wall 55 with a raised rib 58 which is located at the inner free edge of the wall and is formed with an upper flat crown surface that slides easily against the bottom of flange 41. It is the surface of rib 58 upon which the relatively soft layer of metal 58a is plated or otherwise provided.

Even under conditions where there is an initial leakage between such surfaces, I have found that the leak disappears after the surfaces have been worked together by sliding contact upon relative motion of the parts. It can be understood, however, that in the normal installation such sliding contact will only take place at one end of the sealing element 46, since if it turns with the stem 14, there will be relative motion only at the bottom end of the element, and if it does not turn, there will be relative motion only at the top of the element. Moreover, upon installation of the structure thus far described, it would be indeterminate as to where the motion would take place. Also, it will be appreciated that once sliding motion takes place at one end of the element, the surfaces at that end become smoother, thus reducing the chance that any sliding motion will ever start occurring at the other end of the element. Thus, if the sealing element 46 is free to rotate at both ends, self-curing action to overcome leakage will occur at one end but not the other.

While leakage due to surface roughness may be overcome by smoothing, as has just been described, it may also be overcome by designing the parts to have a compressive engagement around a thin line of contact. Under sufficient compression, the sealing element will deform against the adjacent sealing surface causing a tight interlocking. This will also hold the parts tightly together and prevent any relative rotation therebetween. I make use of these factors by preloading the bottom of the sealing element 46 against the wall face 33 and providing a sharp engaging surface in the form of a raised angular rib 59 which is formed at the inner edge of the element bottom wall 56. While the rib 59 does not come to a sharp point, it nevertheless forms a thin band of contact which is adapted to deform against face 33 under compression. The deforming action is also increased by the relatively soft layer of metal 59a which covers the crown of the rib.

Initial compression and fixing of rib 59 against face 33 is achieved by providing in the retainer ring 32 a step or recess 60 formed with a downwardly facing flat shoulder 61. The element 46 is provided with an outer flange 62 which is adapted to fit against shoulder 61, and the height of the top face of the flange from the bottom of the element is initially greater than the height of shoulder 61 from the bottom of the retainer. Thus, as the retainer ring 32 is installed and the plug 30 tightened down against it, shoulder 61 drives flange 62 downwardly compressing rib 59 and fixing it in position. This has the dual effect of overcoming static leakage and holding the element 46 against rotation relative to head 13. Thus, as stem 14 is rotated, there must be relative sliding contact between the crown of upper rib 58 and the face of flange 41. The previously described self-smoothing action then takes place to overcome leakage at the upper end of the element. It should also be noted that while the bottom end of the sealing element is compressed tightly against the head, the upper end of the sealing element is not compressed to any such degree against the stem. Thus, the friction may be quite low even under very high pressures.

While I have described the invention in connection with a rotatable seal, it can be understood that it may also be adapted to other devices wherein a dynamic seal is desired across any relatively movable members having planar interfaces of sealing contact. It will also be understood that modifications of design and construction may be made without departing from the scope of the invention. Therefore, I do not wish to be limited, except as defined in the appended claims.

I claim:

1. A sealed joint including: a first joint member having an annular sealing face extending transversely of the axis of said joint; an opposed relatively movable joint member having an opposed annular sealing face in spaced relationship to said first sealing face, one of said members having an annular cavity therein adjacent to its sealing face and defining therewith a sealing chamber open on one side to fluid under pressure; an annular retainer in said cavity having shoulder means formed with a surface opposed to one of said sealing faces; and a spring metal annular sealing element confined in said chamber within said retainer, said element having cantilevered end walls open centrally of each other to said fluid, and each of said end walls having an annular raised engaging rib on its outer end surface near the free edge of said wall for engagement against said sealing faces; one of said ribs having a sharp crown adapted for metallic deformation against the adjacent sealing face and the other of said ribs having a smooth crown adapted for sliding motion against its adjacent sealing face and said sharp crowned rib being initially forced against its sealing face by engagement of said element with said retainer shoulder means.

2. A rotatable sealed joint including: a first joint member having an annular sealing face extending transversely of the axis of said joint; an opposed relatively rotatable joint member having an opposed annular sealing face in spaced relationship to said first sealing face, one of said members having an annular cavity therein adjacent to its sealing face and defining therewith a sealing chamber open on one side to fluid under pressure; an annular retainer in said cavity having a shoulder opposed to one of said sealing faces; and a spring metal annular sealing element confined in said chamber within said retainer, said element having cantilevered end walls open centrally of each other to said fluid, and each of said end walls having an annular raised engaging rib on its outer end surface near the free edge of said wall for engagement against said sealing faces, one of said ribs having a sharp angular crown adapted for metallic deformation against the adjacent sealing face and the other of said ribs having a smooth crown adapted for sliding motion against its adjacent sealing face and said sharp crowned rib being initially forced against its sealing face by engagement of a flange formed on said element and engaged with said retainer shoulder to prevent any rotation of said element against said last mentioned sealing face.

3. In a high pressure, high temperature fluid seal having a sealing chamber provided with opposed spaced flat sealing faces, the combination of: a spring metal annular sealing element confined in said chamber, said element having cantilevered end walls open centrally of each other to said fluid, and each of said end walls having an annular raised engaging rib on its outer end surface near the free edge of said wall engaged against said sealing faces, one of said ribs having a sharp crown in fixed engagement against the adjacent sealing face and the other of said ribs having a smooth crown in sliding relation with its adjacent sealing face; and means for mechanically fixing said sharp crowned rib against its adjacent sealing face to prevent any relative rotation therebetween, including a retaining ring in said chamber engaging said element and urging it axially towards the end of said chamber opposed to said sharp crowned rib and a relatively soft coating on each of said ribs.

4. A sealed joint including: a first joint member having an annular sealing face extending transversely of the axis of said joint; an opposed relatively movable joint member having an opposed annular sealing face in spaced relationship to said first sealing face, one of said members having a cavity therein adjacent its sealing face and defining therewith a sealing chamber open on one side to fluid under pressure; a retainer in said cavity having shoulder means formed with a surface opposed to one of said sealing faces; and a spring metal annular sealing element confined in said chamber within said retainer, said element having cantilevered end walls open centrally of each other to said fluid, and each of said end walls having an annular raised engaging rib on its outer end surface near the free edge of said wall for engagement against said sealing faces, one of said ribs having a sharp crown adapted for metallic deformation against the adjacent sealing face and the other of said ribs having a smooth crown adapted for sliding motion against its adjacent sealing face and said sharp crowned rib being initially forced against the sealing face by engagement of said element with said retainer shoulder means.

5. A sealed joint including: a first joint member having a flat sealing face extending transversely of the axis of said joints; an opposed relatively rotatable joint member having an opposed flat sealing face in spaced relationship to said first sealing face, one of said members having a cavity therein adjacent its sealing face and defining therewith a sealing chamber open on one side to fluid under pressure; a spring metal annular sealing element confined in said chamber, said element having cantilevered end walls open centrally of each other to said fluid, and each of said end walls having an annular raised engaging rib on its outer end surface near the free edge of said wall for engagement against said sealing faces, one of said ribs having a sharp angular crown adapted for deformation against the adjacent sealing face and the other of said ribs having a smooth crown adapted for sliding motion against its adjacent sealing face, said element having a central section forming a convolution with walls opposed to said end walls to provide pressure balancing surfaces limiting the pressure loading of said end walls; and means for mechanically fixing said sharp crowned rib against its adjacent sealing face to prevent any relative rotation therebetween, including a retaining ring in said chamber engaging said element and urging it axially towards the end of said chamber opposed to said sharp crowned rib.

References Cited

UNITED STATES PATENTS

| 1,840,031 | 1/1932 | Dunmire | 277—110 |
| 2,394,012 | 2/1946 | Rayburn | 277—94 |
| 2,772,848 | 12/1956 | Holzer | 251—172 X |

FOREIGN PATENTS 701,595   12/1953   Great Britain.

LAVERNE D. GEIGER, *Primary Examiner.*

J. S. MEDNICK, *Assistant Examiner.*